UNITED STATES PATENT OFFICE.

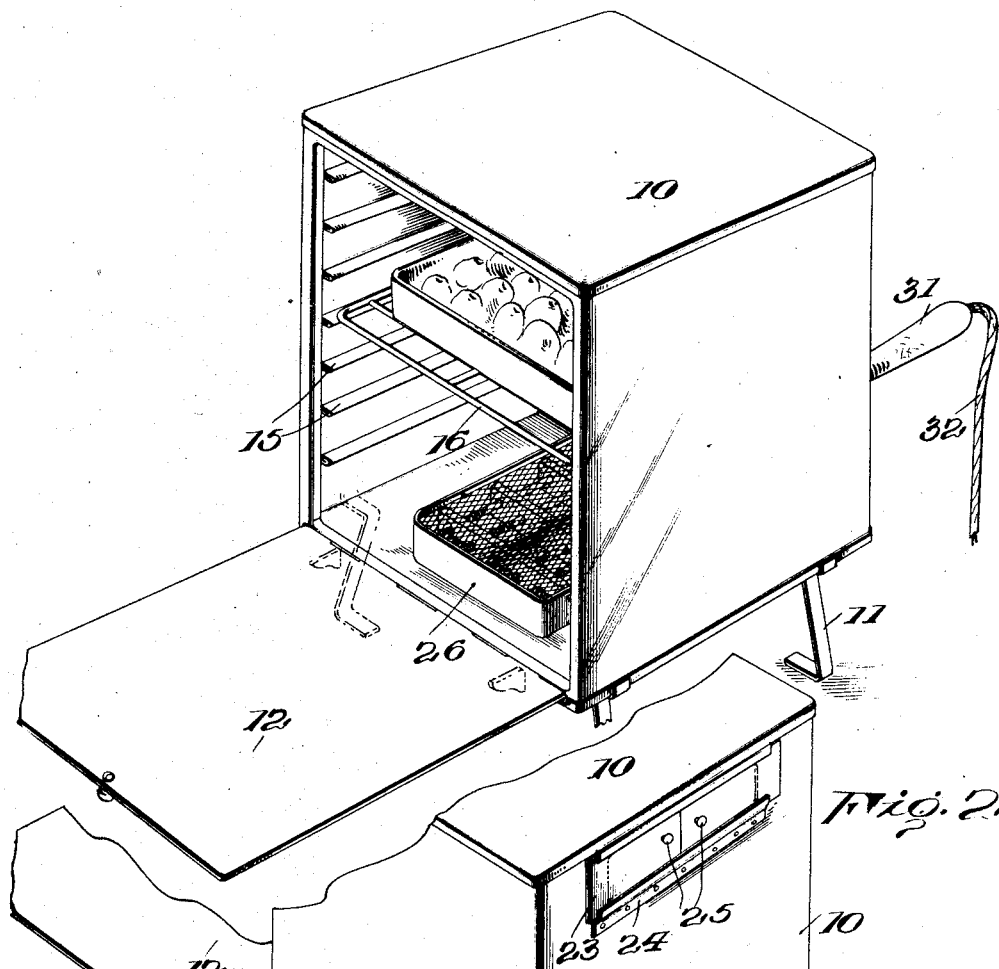
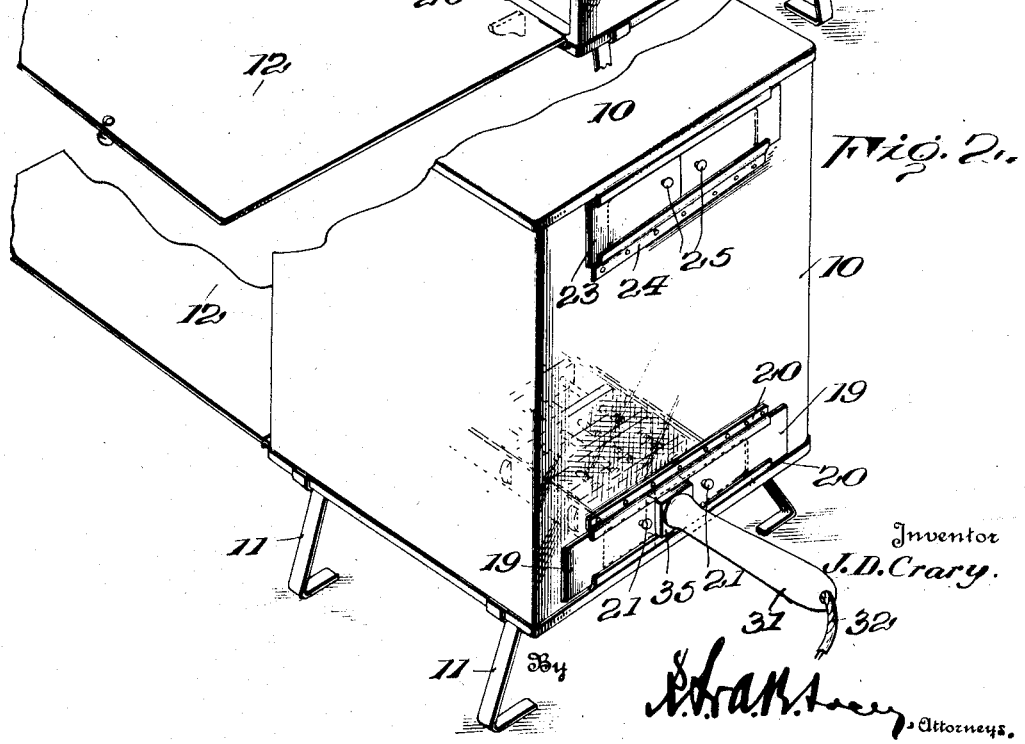

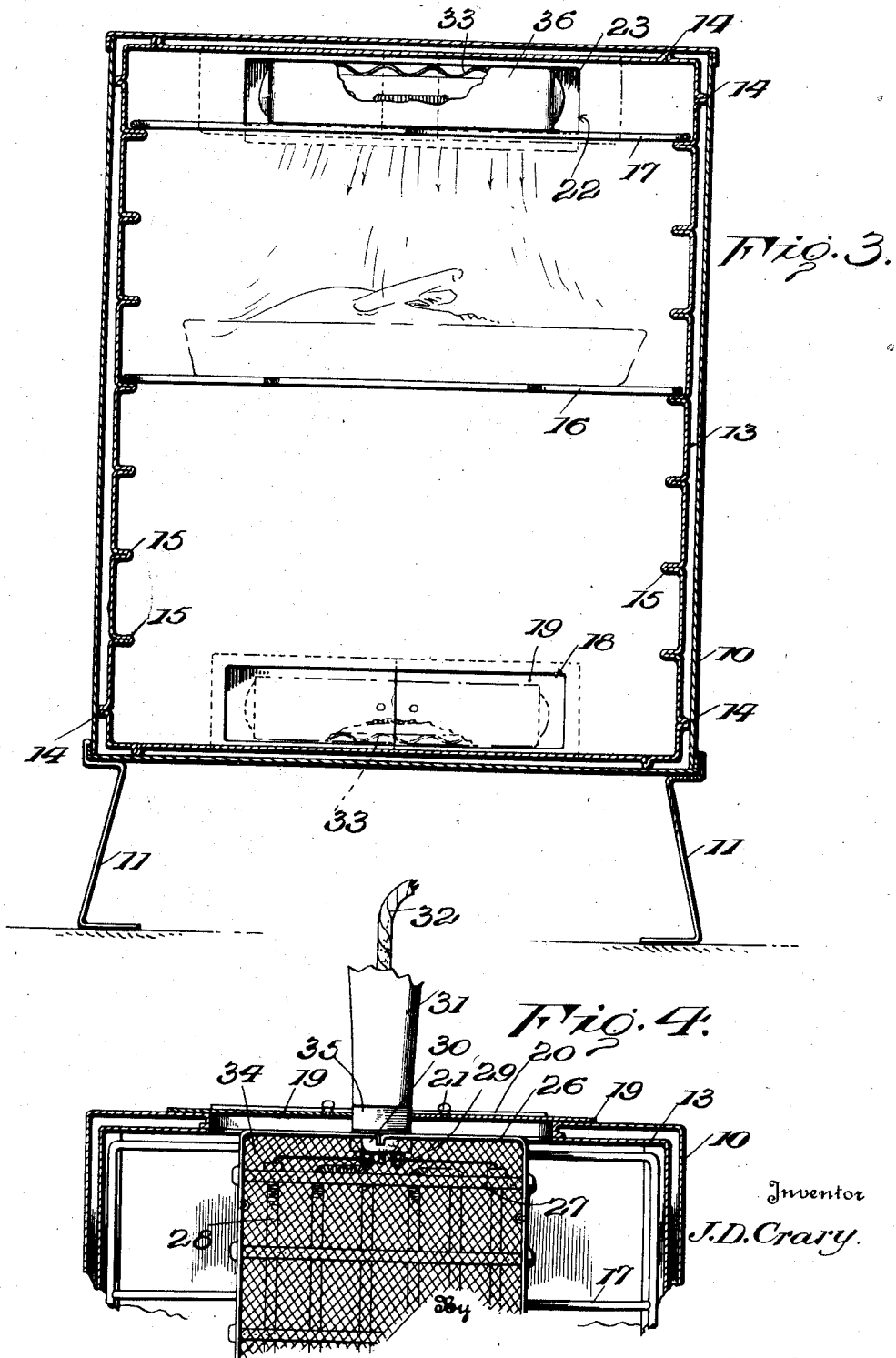

JAY D. CRARY, OF ABERDEEN, WASHINGTON.

ELECTRIC OVEN.

1,282,195.  Specification of Letters Patent.  Patented Oct. 22, 1918.

Application filed October 10, 1917. Serial No. 195,825.

*To all whom it may concern:*

Be it known that I, JAY D. CRARY, a citizen of the United States, residing at Aberdeen, in the county of Grays Harbor and State of Washington, have invented certain new and useful Improvements in Electric Ovens, of which the following is a specification.

This invention relates to an improved electric oven and has as its primary object to provide a device of this character particularly adapted for domestic uses.

The invention has as a further object to provide an oven wherein the heater therefor will be electrically connected entirely independent of the oven so that the said heater may be removed and used for other purposes.

A further object of the invention in this connection is to provide an oven wherein the heater will be equipped with a handle so that the said heater may be readily placed within or removed from the oven without likelihood of burning the hands.

And a still further object of the invention is to provide a construction wherein the oven will be formed with heater door openings adjacent the upper and lower portions thereof so that the heater may be arranged upon the bottom of the oven for ordinary baking purposes and may then be removed and placed in the upper portion of the oven in inverted position for browning purposes.

Other and incidental objects will appear as the description proceeds and in the drawings wherein I have illustrated the preferred embodiment of the invention and wherein similar reference characters designate corresponding parts throughout the several views:

Figure 1 is a perspective view of my improved oven showing the oven door open and illustrating the heater arranged upon the bottom wall of the oven lining, Fig. 2 is a fragmentary rear perspective view showing the heater doors in the back wall of the oven body.

Fig. 3 is a vertical sectional view looking toward the back wall of the oven body and illustrating the heater arranged in inverted position in the upper portion of the oven, and Fig. 4 is a transverse sectional view particularly illustrating the manner in which the heater doors of the oven are arranged to coact with the handle of the heater for closing the oven.

In carrying out the invention, my improved oven is formed with a body 10 which may be of any approved general design and is provided with suitable legs 11. Normally closing the front side of the oven body is a door 12 movable to horizontal open position to provide a shelf. Mounted within the oven body is a lining 13 therefor. This lining is arranged to confront the side, top and bottom walls of the oven body and is preferably rebent upon itself to provide a plurality of ribs 14 supporting the lining in spaced relation to the said body walls. The side walls of the lining are preferably further rebent inwardly to form a plurality of oppositely disposed ledges 15 for removably supporting a shelf 16 at various elevations within the oven. A second shelf 17 is arranged upon the pair of ledges adjacent the top of the oven. These shelves 16 and 17 may be of any approved type. Formed through the back wall of the oven body adjacent the bottom thereof is a heater door opening 18 normally closed by complemental sliding doors 19. The doors 19 are, as particularly shown in Fig. 2 of the drawings, arranged to seat against the outer face of the back wall of the oven body and are slidably supported by suitable flanges 20 secured to the said wall. Preferably, the doors 19 are, at their inner end, equipped with suitable knobs 21. Formed through the back wall of the oven body adjacent the top thereof is a heater door opening 22 similar to the door opening 18. The bottom edge of the door opening 22 is arranged substantially in a plane with the shelf 17 and normally closing the said opening are complemental sliding doors 23 similar to the doors 19 and slidably supported in like manner by suitable flanges 24 secured to the back wall of the oven body. At their inner ends, the doors 23 are equipped with knobs 25.

Arranged to coöperate with the oven is an electric heater therefor. This heater is described in detail in my copending application filed October 10, 1917, Serial No. 195,826. However, for the purpose of the present invention, it may be generally stated that this heater includes a frame 26 open upon opposite sides thereof and between the side members of which is mounted a plurality of spaced cross slats 27 of suitable insulating material. Threaded through these slats is a heating unit 28 the ends of which are connected to spaced terminals 29 carried by an insulating plug 30 upon the frame. Connected with this plug is a handle 31 for the heater and threaded through the said handle is an electric cord 32 the circuit wires of which are secured to the terminals 29. Thus, the heater may be easily manipulated by grasping the handle 31 and it will be seen that the said heater is electrically connected entirely independent of the oven. Closing the lower side of the frame and arranged to coöperate with the heating unit 28 is a corrugated reflector 33 and arranged within the upper side of the frame is a suitable guard 34. It is now to be particularly observed that the handle 31 of the heater is squared at its inner extremity and is equipped with a suitable ferrule 35.

As shown in Fig. 3 of the drawings, the door opening 18 is of a size to freely receive the frame 26 of the heater so that by grasping the handle 31, the heater may be inserted into the oven to rest upon the bottom wall of the lining 13 of the oven body with the handle projecting through the said door opening exteriorly of the oven. The doors 19 are then shifted to engage the ferrule 35 of the handle, as shown in Fig. 2 of the drawings, and since the said handle is formed with a squared inner terminal, the inner edges of these doors will thus coöperate with the said ferrule for closing the door opening. When thus arranged in position in the bottom of the oven, the heater is disposed with the reflector 33 adjacent the bottom wall of the oven lining so that the said reflector will thus direct the heat from the heating unit 28 up through the open side of the heater toward the shelf 16. This arrangement of the heater will be used for general baking purposes and as will be seen various articles of food which it is desired to bake, may be placed upon the shelf 16 and positioned with respect to the heater by varying the elevation of the said shelf. For browning, the heater is removed from position at the bottom of the oven and inserted through the door opening 22 to be rested, as shown in Fig. 3, upon the shelf 17 at the top of the oven and, of course, the doors 23 are arranged to coöperate with the ferrule 35 upon the handle 31 of the heater for closing the said door opening with the handle projecting exteriorly of the oven. When so disposed, the heater is inverted so that the reflector 33 thereof is then arranged adjacent the top wall of the oven lining. Consequently, heat from the heating unit 28 will be directed downwardly within the oven against any articles of food arranged upon the shelf 16.

It will therefore be seen that I provide a particularly simple construction for the purpose set forth and an electric oven which will prove highly efficient for general domestic cooking. Furthermore, it will be particularly noted that the position of the heater within the oven may, by grasping the handle of the heater, be changed without likelihood of burning the hands and since the heater is not in any way dependent upon the oven for its supply of electrical current, the heater may, when desired, be removed from the oven and readily used independently of the oven as a heater for other purposes.

Having thus described the invention, what is claimed as new is:

1. An electric oven including a body formed with a heater door opening and provided with a door, and a heater removably fitted within the oven through the said opening and provided with a handle projecting exteriorly of the oven body through said door opening and formed to coact with the door whereby the door may be moved to abut the handle for closing the oven.

2. An electric oven including an oven body provided with separate heater door openings adjacent the top and bottom thereof, doors normally closing said openings, and a heater adapted to be removably fitted within the oven through either of the said openings and electrically connected independently of the oven.

3. In an electric oven, the combination with an oven body provided with heater door openings adjacent the top and bottom thereof, of an open sided electric heater provided with a reflector at one side of the heating unit thereof, the said heater being adapted to be removably fitted within the oven through the lowermost opening in position with the said reflector arranged below the heating unit for directing the heat upwardly within the oven and being adapted to be removably fitted within the oven through the uppermost opening in inverted position with the reflector arranged above the heating unit for directing the heat downwardly within the oven.

4. An electric oven including an oven body provided in one wall thereof with a service door opening, a service door normally closing the said opening, another wall of the body being formed with a heater door opening, and a heater removably fitted within the oven body through the said heater door opening.

In testimony whereof I affix my signature.

JAY D. CRARY.